United States Patent [19]

Manring

[11] 4,135,905
[45] Jan. 23, 1979

[54] PROCESS FOR GLASS MELTING

[75] Inventor: William H. Manring, Hamilton, Ohio

[73] Assignee: FMC Corporation, Philadelphia, Pa.

[21] Appl. No.: 854,866

[22] Filed: Nov. 25, 1977

Related U.S. Application Data

[63] Continuation of Ser. No. 711,900, Aug. 5, 1976, abandoned.

[51] Int. Cl.$^2$ .................................................. C03B 5/02
[52] U.S. Cl. ........................................ 65/136; 65/134
[58] Field of Search .................................. 65/134, 136

[56] References Cited

U.S. PATENT DOCUMENTS

| | | | |
|---|---|---|---|
| 2,599,349 | 6/1952 | Ricker | 65/134 |
| 3,281,255 | 10/1966 | Brewster | 106/54 |
| 3,351,474 | 11/1967 | Hagedorn | 65/134 |
| 3,607,189 | 9/1971 | Manring | 65/134 |
| 3,826,635 | 1/1973 | Hall et al. | 65/134 |
| 3,852,079 | 12/1974 | Davis | 106/50 |
| 3,901,718 | 8/1975 | Wu | 106/47 R |

OTHER PUBLICATIONS

Handbook of Glass Manufacturing, vol. I, p. 25, by F. V. Tooley, Published by Books for Industry, 1974.

*Primary Examiner*—Arthur D. Kellogg
*Attorney, Agent, or Firm*—Frank Ianno

[57] ABSTRACT

Process for improving operations of an electric furnace for melting glasses is described wherein about 0.1 to about 7%, expressed as BaO, of barium carbonate is added to the glass batch to form a permeable and pliant batch blanket on the glass melt in the electric furnace.

4 Claims, No Drawings

PROCESS FOR GLASS MELTING

This is a continuation of application Ser. No. 711,900, filed Aug. 5, 1976 now abandoned.

The present invention is concerned with a process for improving the melting of glass in electric furnaces.

The practice of producing and melting glass in electric furnaces is well known. In this type of glass furnace, which may be either rectangular or hexagonal in shape, electrodes are present in either the bottom or the sides of the furnace and these electrodes, when electrolyzed, melt glass batch which is present between the electrodes to form glass. In normal operation a uniform, coherent layer of glass batch, normally termed a "batch blanket," is placed over the melted glass to serve both as a feed for the glass furnace and also to insulate the furnace against loss of heat from the molten glass present in the bottom of the furnace.

The practice of melting glass electrically is growing in popularity in this country and elsewhere for many reasons. Initially, the electric furnaces have substantially reduced emissions compared to conventional gas-fired furnaces and, therefore, can comply with emission standards more readily. Fossil fuel-fired glass furnaces normally require more elaborate and expensive pollution control equipment to operate with acceptable emissions. In addition, the shortage of fossil fuels makes expansion of conventional furnaces more difficult and electrical furnaces require lower capital costs for equivalent installations.

Despite the advantages of electric glass melting furnaces, the operation of these furnaces have encountered some serious problems. One major problem that occurs is that the batch blanket becomes stiff and rigid and does not permit the free passage and escape of gases through such blanket. The gases are generated during the fusion and reaction of the ingredients of the glass batch, and must be removed from the furnace. When this blanket stiffening occurs, numerous hot spots appear on the surface of the batch blanket in the form of large bubbles with heavy foaming and violent eruptions. These violent and clearly visible breaches in the batch blanket result in rapid drops in furnace temperatures, the exposure of molten glass surface, and loss of large amounts of heat which disrupt the integrity of the batch blanket and which interfere seriously with any chance for an efficient, completely controlled operation of the electric furnace.

One technique which is normally used to maintain the batch blanket permeable, pliant and with a minimum of hot spots is to maintain the temperature of the molten glass in the furnace at a high temperature (not under 2,600° F.). Apparently, the high temperature of the molten glass within the furnace tends to soften and otherwise keep the batch blanket permeable, permitting the gases to pass through the blanket with a minimum of hot spots during the furnace operation.

One difficulty with employing excessively high temperatures than are required to melt the glass, solely for the purpose of keeping the blanket pliable, is the increased cost of electricity required to maintain such excessively high temperatures. This is rather important, since the cost of electrical energy constitutes a major expense in running an electric furnace. Another difficulty is that the higher temperatures result in rapid wear of the refractory sidewall blocks of the furnace. Small differences in temperature, e.g. 150° F., can make great differences, e.g. twice the life, in the durability of the refractory material. Further, if the temperature climbs too high, the batch blanket can be burnt off too quickly, causing additional foaming and blowouts. In extreme cases, this can lead to complete, uncontrolled burn-up of the entire unit.

The necessity of maintaining the batch blanket pliable and permeable by the use of high temperatures also has another drawback. The glass furnace becomes very sensitive to pull rates, that is, the rates at which the molten glass is removed from the furnace. If the pull rate is increased, for example, this limits the temperature of the molten glass in the furnace which, in turn, prevents the batch blanket from remaining porous and pliant; too low a pull rate increases melt temperatures which accelerates melting of the blanket, causing additional foaming and blowouts.

Another difficulty is that it is difficult to employ conventional refining agents, termed "fining agents," such as sodium sulfate or calcium sulfate in electric furnaces. These additives are desirable in conventional fired furnaces because they reduce the melt rate and increase the rate at which the glass is refined in the furnace. However, the use of even small amounts of these materials in electric furnaces increases the problem of foaming and hot spots which occur when too low melting temperatures are present in the furnace. Unfortunately, lack of these conventional refining agents in the batch requires even higher temperatures in the furnace, which further compounds the overall problem of trying to maintain a permeable, pliant batch blanket without excessive temperatures in the furnace.

It has now been found that operation of electric glass furnaces can be improved so as to maintain a controlled and thermally insulating batch blanket with a minimum of hot spots by adding from 0.1% to 7.0% by weight, and preferably 0.5 to 1.5% by weight, expressed as BaO, of barium carbonate in the glass batch.

The mechanism by which the barium carbonate improves the operation of the glass furnace is not clear. It is known, however, that the addition of the barium carbonate has the effect of making the batch blanket more premeable and pliant to permit escape of gases formed in the glass making process without hot spots and other breaches in the batch blanket. Apparently, the gases are able to escape through the blanket without building up pressure and erupting through the blanket under pressure. Further, the blanket appears to become pliant and permeable without the need for temperatures above 2,600° F. This is most important, since it means that the life of the refractory is increased and excessive amounts of electricity need not be expended to maintain excessively high temperatures within the electric furnace.

While the exact reason for the effectiveness of the barium carbonate additive is not known, it has been recognized that barium carbonate in connection with other materials, such as sodium carbonate, does form eutectics which are substantially lower, e.g. 200° F. lower, than the normal melting points of these ingredients. It is considered that this may be an important advantage in terms of keeping batch blankets pliable so that the gases, which are evolved in the furnace during the fusion, may have free passage through the blanket. Interestingly, the substitution of barium sulfate, rather than barium carbonate, does not, apparently, yield the desired results found with barium carbonate. However, regardless of this understanding, the barium carbonate, when added to the glass batch set forth herein, is effective in the production of the various types of glasses, classified principally as borosilicate glasses or soda-lime glasses, in electric furnaces.

In the operation of the present invention, the barium carbonate is added to the batch in amounts to yield 0.1% to a maximum of 7% by weight, expressed as BaO, with the recommended level being from about 0.5 to 1.5% on a BaO basis. The major limiting factor in the amount of the barium carbonate which is added is an economic one. Generally, amounts over 1.5%, expressed as BaO, of barium carbonate will achieve the results desired, but the improvement thereafter is not in proportion to the increased amount of barium carbonate which is added to the glass batch.

In carrying out the invention, the barium carbonate is simply mixed with the glass batch in the appropriate proportions desired and the glass batch is then fed uniformly to the top of the furnace so as to maintain a blanket of glass batch over the surface of the electric furnace. In general, the added glass batch, which is uppermost in the batch blanket, should remain cool, indicating that little of the furnace heat is being evolved through the top of the blanket. The general method of feeding such glass furnaces is by the so-called distributing chargers, which employ a long arm with a moving belt mounted thereon, to distribute the charge uniformly over the surface of the blanket on a continual basis. The location of the batch spill end of the moving belt can be varied by extending or contracting the support arm on which the belt rests and, in this way, a uniform charge can be distributed equally and uniformly over the entire surface of the glass furnace.

The following examples are given to illustrate the invention but are not deemed to be limiting thereof.

EXAMPLE 1

Run A — Standard Batch — Prior Art Process

A commercial sized electric glass furnace of hexagonal shape and having electrodes in each of the six sides of the furnace was used to prepare molten glass by feeding the mixture set forth below in Table I to the furnace by means of a distributing charger, in the form of an extendable arm with a moving belt feeder mounted thereon, which distributed the charge uniformly over the surface of the furnace. The charge is given on a 2,000 pound sand basis for ease of computation.

In the operation of the standard batch there were many hot spots on the surface of the blanket, indicating direct exposure of the hot melt and emission of gases and heat from these spots.

Run B — Process of the Invention

The procedure of the invention was then utilized in Runs 1, 2, 3, 4 and 5 by adding barium carbonate in the amounts set forth below in Table I to the glass batch without otherwise changing furnace conditions. In addition, the $P_2O_5$ level of the glass was also adjusted by adding Glass H; $P_2O_5$ introduction did not effect any operations of the glass making process. Upon introduction of the barium carbonate into the glass batch in Run 1, the batch blanket was found to be pliable and not to exhibit any crusting or stiffness regardless of how thick the blanket was made. This is in contrast to the stiffer crusting effect which is observed in the standard batch. The number of hot spots which are present on the surface of the batch blanket decreased in Runs 1, 2 and 3 until there was but one such remaining hot spot observable and much more stable operation of the glass furnace was obtained. At levels above 1.4%, expressed as BaO, the effect of the added barium carbonate did not show as much proportional improvement as the addition of the barium carbonate in Runs 1, 2 and 3. But in all events, barium carbonate above the 1.4% level, expressed as BaO, (Runs 4 and 5) gave all of the desirable effects of the addition of barium carbonate as Runs 1, 2 and 3 where smaller amounts of BaO were added. No apparent detrimental effect of adding barium carbonate to the glass batch was observed. It was also found that the furnace could handle and melt increased amounts of glass batch with similar power levels as were used in the standard batch run. The resulting chemical compositions of the batch, in part, are also set forth below in Table I.

EXAMPLE 2

The make-up of batches of soda-lime glass with barium carbonate for use in the same manner as set forth in Example 1 above are set forth below in Table II. Again, the batch blanket make-up is based on a 2,000 pound sand basis, for ease of computation. The amount of barium carbonate set forth in this soda-lime glass is 1.05% on a BaO basis. The amount required for ranges of 0.13% to 2.61% are also set forth below in Table II. The results of using barium carbonate as set forth in the above batch would be considered equal to those set forth when using barium carbonate in the borosilicate glass as set forth in Example 1.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

TABLE I

| | Standard Batch | Run 1 | Run 2 | Run 3 | Run 4 | Run 5 |
|---|---|---|---|---|---|---|
| Batch Data | Opal Borosilicate Glass | | | | | |
| Sand | 2,000 lb | 2,000 lb | 2,000 lb | 2,000 lb | 2,000 lb | 2,000 lb |
| Borax (anhydrous) | 582 | 582 | 584 | 586 | 588 | 590 |
| Nepheline Syenite | 92 | 74 | 55 | 36 | 19 | 0 |
| Mono-calcium Phosphate | 103 | 80 | 60 | 32 | 20 | 0 |
| Burnt Lime | 0 | 7 | 14 | 22 | 28 | 32 |
| Fluorspar | 20.5 | 20.5 | 20.5 | 20.5 | 20.5 | 20.5 |
| Glass H | 0 | 25 | 50 | 81 | 200 | 125 |
| Barium Carbonate | 0 | 20 | 40 | 60 | 80 | 100 |
| Niter | 8 | 8 | 8 | 8 | 8 | 10 |

TABLE I-continued

| | Standard Batch | Opal Borosilicate Glass | | | | |
| --- | --- | --- | --- | --- | --- | --- |
| | | Run 1 | Run 2 | Run 3 | Run 4 | Run 5 |
| Cullet | 1,508 | 1,508 | 1,508 | 1,510 | 1,536 | 392 |
| % Cullet | 35 | 35 | 35 | 35 | 35 | 12 |
| Total Weight | 4,313.5 | 4,324 | 4,340 | 4,355 | 4,440 | 3,270 |
| Chemical Compositions (%) | | | | | | |
| $SiO_2$ | 74.30 | 73.80 | 73.30 | 72.8 | 72.30 | 71.70 |
| $Al_2O_3$ | 1.20 | 1.0 | 0.8 | 0.6 | 0.4 | 0.20 |
| $Fe_2O_3$ | 0.10 | | | | | 0.05 |
| CaO | 1.10 | | | | | 1.30 |
| BaO | 0.00 | 0.40 | 0.90 | 1.40 | 1.90 | 2.40 |
| $Na_2O$ | 6.70 | | | | | 7.60 |
| $B_2O_3$ | 14.20 | | | | | 14.40 |
| $K_2O$ | 0.30 | | | | | 0.00 |
| $F_2$ | 0.10 | | | | | 0.10 |
| $P_2O_5$ | 2.00 | 2.05 | 2.10 | 2.15 | 2.20 | 2.25 |

TABLE II

| | Example of Usage, Soda-Lime Glass (Median Range) | | | | | | | | | |
| --- | --- | --- | --- | --- | --- | --- | --- | --- | --- | --- |
| | | Chemical Composition | | | | | | | | |
| | | $SiO_2$ | $Al_2O_3$ | $Fe_2O_3$ | CaO | MgO | $Na_2O$ | $K_2O$ | BaO | $SO_3$ |
| Sand | 2,000 lb | 1,990 | 2 | 0.6 | | | | | | |
| Soda Ash | 700 lb | | | | | | 406 | | | |
| *Barium Carbonate | 40 lb | | | | | | | | 31 | |
| Limestone | 550 lb | | | 0.3 | 302 | 3 | | | | |
| Feldspar | 220 lb | 316 | 38 | 0.2 | 4 | | 12 | 10 | | |
| Salt Cake | 10 lb | | | | | | 4 | | | 5 |
| Carbon | 1 lb | | | | | | | | | |
| Decolorizer | 1 lb | 2,126 | 40 | 1.1 | 306 | 3 | 422 | 10 | 31 | 5 |
| Percent | | 72.21 | 1.36 | 0.04 | 10.40 | 0.10 | 14.33 | .34 | 1.05 | .17 |

*If we used: (instead of 40 lb. indicated above)
5 lb.-BaO content would be approximately 0.13%
20 lb.-BaO content would be approximately 0.26%
30 lb.-BaO content would be approximately 0.78%
40 lb.-BaO content would be approximately 1.05%
50 lb.-BaO content would be approximately 1.70%
100 lb.-BaO content would be approximately 2.61%

What is claimed is:

1. In the process of forming glass in an electric furnace wherein glass batch is melted by means of electrical heating elements present in said furnace to produce molten glass and said molten glass is maintained liquid in the bottom of said furnace, and a uniform, coherent blanket of glass batch is maintained above said molten glass to serve as feed and as an insulating blanket by continually feeding glass batch onto the surface of the batch blanket, and wherein molten glass is continually removed from the furnace, the improvement which comprises adding from about 0.1 to about 7% by weight, expressed as BaO, of barium carbonate to the glass batch, to maintain said uniform, coherent blanket of glass batch above said molten glass permeable to gases generated during the continuous melting of part of the glass batch.

2. Process of claim 1 wherein there is added from about 0.5 to about 1.5% by weight, expressed as BaO, of barium carbonate.

3. Process of claim 1 wherein the glass is a borosilicate glass.

4. Process of claim 1 wherein the glass is a soda-lime glass.

* * * * *